United States Patent

Tresser et al.

[11] Patent Number: 5,946,455
[45] Date of Patent: Aug. 31, 1999

[54] MODEL BASED ERROR DIFFUSION WITH CORRECTION PROPAGATION

[75] Inventors: Charles P. Tresser, Mamaroneck; Chai Wah Wu, Ossining, both of N.Y.

[73] Assignee: International Business Machines Corporation, Armonk, N.Y.

[21] Appl. No.: 08/942,624

[22] Filed: Oct. 2, 1997

[51] Int. Cl.$^6$ .................................................. G06F 15/00
[52] U.S. Cl. .......................... 395/109; 358/456; 358/534; 382/252
[58] Field of Search ................................. 395/109, 101; 358/456, 457, 458, 459, 460, 455, 465, 466, 298, 534, 535, 536, 533, 454, 518; 382/252, 237, 270, 274, 275; 345/136, 137, 138

[56] References Cited

U.S. PATENT DOCUMENTS

| | | | |
|---|---|---|---|
| 5,055,942 | 10/1991 | Levien | 358/456 |
| 5,150,429 | 9/1992 | Miller et al. | 358/457 |
| 5,172,247 | 12/1992 | Ghaderi | 358/456 |
| 5,268,774 | 12/1993 | Eschbach | 358/466 |
| 5,317,653 | 5/1994 | Eschbach et al. | 358/456 |
| 5,325,211 | 6/1994 | Eschbach | 358/466 |
| 5,353,127 | 10/1994 | Shiau et al. | 358/458 |

*Primary Examiner*—Dov Popovici
*Attorney, Agent, or Firm*—Whitham, Curtis & Whitham; Stephen C. Kaufman

[57] ABSTRACT

A printing method and apparatus takes into account the errors in the amount of black due to dot shape and size at the pixel where these errors occur, propagates corrections of these errors in order to preserve the logics of error diffusion, and permits a trade-off between completeness of the correction and computational time. The method and apparatus corrects for the actual shape of the printer dots in most error diffusion methods usable in digital halftoning.

8 Claims, 3 Drawing Sheets

MODEL BASED ERROR DIFFUSION WITH CORRECTION PROPAGATION

BACKGROUND OF THE INVENTION

1. Field of the Invention

The present invention generally relates to halftoning techniques in printers and, more particularly, to a system and method to correct for the actual shape of the printer dots with the correction being propagated so that the error management is consistent with the rationale of error diffusion methods.

2. Description of the Prior Art

Most printers today can print in only a limited number of colors. Halftoning consists in printing a picture (or more generally displaying it on some two-dimensional medium) with small dots in a limited number of colors such that it appears to consist of many colors when viewed from some distance. For example, a picture of black and white dots can appear to display grey levels when viewed from some distance.

Error diffusion, as first described in "An Adaptive Algorithm for Spatial Greyscale" by R. W. Floyd and L. Steinberg in Proceeding of the SID 17/2, (1976) pp. 75–77, is a popular technique for halftoning used today and is considered to be one of the best, and the best among the techniques with similar operating time. This technique and others are reviewed in the book *Digital Halftoning*, MIT Press, Cambridge, Ma. 1987, by R. Ulichney which is a general reference for digital halftoning.

The operation of error diffusion basically spreads the error occurring at a given pixel across neighboring pixels. The spreading of the error is described by an ordered set of numbers called filter coefficients forming together an error filter. At each point, the input image data is combined with the diffused error and a printing decision is made according to some threshold.

After Floyd and Steinberg, other filters were proposed, in particularly by J. F. Jarvis, C. N. Judice and W. H. Ninke in "A Survey of Techniques for the Display of Continuous Tone Pictures on Bilevel Displays", *Computer Graphics and Image Processing*, Vol. 5, (1976) pp. 13–40, and by P. Stucki in "MECCA—A Multiple-Error Correction Computation Algorithm for Bi-Level Image Hardcopy Reproduction", IBM Res. Rep., RZ1060 (1981). Error diffusion has been further enriched, for instance by varying the threshold, in order to cluster dots or to reduce artifacts, for instance in "Halftoning Techniques Using Error Correction", *Proceedings of the SID*, Vol. 27/4 (1986) pp. 305–308, by G. S. Fawcett and G. F. Schrack, in U.S. Pat. No. 5,055,942 to R. L. Levien, in U.S. Pat. No. 5,150,429 to R. L. Miller and C. M. Smith, or in U.S. Pat. No. 5,325,211 to R. Eschbach, and varying the filter according to grey regions and compensating for the problems hereby introduced, in order to reduce artifacts, for instance in "Computer-generated Holograms with Pulse-density Modulation", *J. Opt. Soc.* A1 (1984) pp. 5–10, by R. Hauck and O. Bryngdhal, or in "Reduction of Artifacts in Error Diffusion by Means of Input-dependent Weights", *J. El. Imag.* 2(4) (1993) pp. 352–358, by R. Eschbach.

Since there are several error diffusion algorithms, we use a general presentation to define them. For simplicity, we will discuss only the case of black and white pictures, but the discussion and our invention apply to color pictures as well. In the sequel, all matrices considered together have the same arbitrary size. With G standing for a matrix of grey levels defining a greyscale picture, a digital halftoning method is a G-independent algorithm A which defines a matrix M of white and black dots with the purpose of imitating G as closely as possible, in terms of giving an as close as possible visual impression. We will assume the picture is described on a square grid, although other types of grids such as hexagonal grids are also possible.

For standard error diffusion algorithms, defining A includes the following ingredients:

For each site (i,j) where A operates, a list L(i,j) of neighbors of (i,j) where A has already operated. The set L(i,j) for the preferred embodiment is shown shaded in FIG. 1.

For each (k,l) in L(i,j), a coefficient c(i-k,j-l) where we have expressed that the coefficient only depends on (i-k) and (j-l) (in fact, in most cases, only on |i-k| and |j-l| or on $(i-k)^2+(j-l)^2$).

A matrix of states S, defined by setting S(i,j) equal to G(i,j) minus the sum of the errors at all (k,l)s in L(i,j) weighted by the coefficients c(k-i,l-j), the error E(k,l) at (k,l) being computed as the difference S(k,l)-sign(S(k,l)). Here sign is the signum function (sign(x)=-1 if x<0, sign(x)=1 otherwise).

We assume that the grey levels are represented by a number between -1 and 1, with -1 indicating white and 1 indicating black. With these ingredients, the formulas defining an error diffusion algorithm read $$S(i, j) = G(i, j) + \sum_{(k,l) \in L(i,j)} c(i-k, j-l) E(k, l),$$

$$M(k, l) = \text{sign}(S(k, l) - t), \text{ and}$$

$$E(k, l) = S(k, l) - M(k, l).$$

A threshold t is added to the standard algorithm, which may depend on several ingredients in several ways and can either be constant or vary from point to point.

Stucki already considered the problem of compensating for actual black dot sizes and shapes in error diffusion, which is important since the basic method assumes square black and white dots of the same size. Error diffusion makes it harder to calibrate according to printer performances than passive dithering methods, as discussed for instance in "Measurement of Printer Parameters for Model-based Halftoning", *J. El. Imag.*, 2(3) (1993), pp. 193–204, by T. N. Pappas, C. K. Dong, and D. I. Neuhoff, or in "Measurement-based Evaluation of a Printer Dot Model for Halftone Algorithm Tone Correction", *J. El. Imag.*, 2(3) (1993), pp. 205–212, by C. J. Rosenberg, making it preferable to use model-based error diffusion as described for instance in "Printer Models and Error Diffusion", *IEEE Transactions on Image Processing*, 4(1) (1995), pp. 66–80, by T. N. Pappas and D. L. Neuhoff, or in "A modified error-based error diffusion", *IEEE Signal Processing Letters*, 4(2) (1997), pp. 36–38, by Y. Lin and T. C. Ko.

Problems to be Solved

We use here the notations previously defined. In algorithms previous to the one of Lin and Ko, the effect of the size of the black dots is only considered by checking if the black dots which have previously been printed do cover (i,j). The algorithm of Lin and Ko goes further by absorbing somehow the errors made to previously considered points by modifying the black value at (i,j) but does not correct exactly the matrix E at any previous site and does not propagate the corrections to the matrix E.

More precisely, let us denote N(i,j) as the list of sites possibly affected by a black dot printed at (i,j) and denote P(i,j) as the list of sites treated by A before (i,j). In the preferred embodiment, N(i,j) just consists of the eight neighboring pixels of the pixel at (i,j).

Most pre- Lin and Ko algorithms only take care of points belonging to N(i,j)\P(i,j) (where for two sets A and B, A\B is the set of points in A but not in B). The algorithm of Lin and Ko takes complete care of the points in N(i,j)\P(i,j) and it takes care of a few of the points in N(i,j)∩P(i,j) in an incomplete way, (where for two sets A and B, A∩B is the set of points belonging both to A and to B).

To summarize, there are three main problems to be solved:
1. The amount of black has to be taken account of at the pixel where it occurs,
2. The corrections due to dot shape and size have to be propagated in order to preserve the logics of error diffusion, and
3. Either the correction of the error has to be complete or one should be able to estimate how much error is left to decide on a trade-off between completeness of the correction and computational time.

SUMMARY OF THE INVENTION

It is therefore an object of the present invention to provide a printing method and apparatus which takes into account the errors due to the actual shape of printed dots at the pixel where they occur.

It is another object of the invention to provide a printing method and apparatus which propagates corrections due to dot shape and size in order to preserve the logics of error diffusion.

It is a further object of the invention to provide a printing method and apparatus which permits a trade-off between completeness of the correction and computational time.

According to the invention, there is provided a method and apparatus which corrects for the actual shape of the printer dots in most error diffusions methods usable in digital halftoning. The correction is made at the pixels where errors occur, and the correction is propagated so that the error management is consistent with the rationale of error diffusion methods.

In contrast to previously proposed methods, and using the same notations we used to describe the problems to be solved, our invention takes complete care of all points in N(i,j)\P(i,j), takes complete care of all points in N(i,j)∩P(i,j), and propagates the error to other points. Complete propagation of the error to all the cells which might be affected results in a $O(n^3)$ algorithm. In the preferred embodiment, we propagate the error only to cells in M(i,j) which is a small set of pixels close to the current cell. This results in a $O(n^2)$ algorithm.

To achieve these improvements, the first step in our invention consists in modifying any error diffusion algorithm by defining, beside the usual matrices S and E,
   a matrix D of printing decisions (no action or print a black dot at (i,j)) (which is already necessary for some error diffusion methods defined for other purposes),
   a matrix V of actual areas in each pixel covered by black ink, (where −1 stands for no ink, 1 stands for the entire pixel being covered with ink, 0 stands for half of the surface of the pixel being covered with ink, and so on), and
   a matrix I taking account of which dots, at or near (i,j), contributed to the black ink at site (i,j).

Since points processed far in the past are not needed again and points to be processed far in the future are not needed yet, only a portion of these matrices needs to be processed and stored at any one time.

With these additions to standard error diffusion, the rest of our invention can be abstractly defined as:
1. accurate bookkeeping (everywhere) of the matrices D, V, and I, and
2. bookkeeping of the error matrix E, so that it is accurate enough (alternatively, bookkeeping of the state matrix S is done and E is obtained via the expression E=S−V). In contrast to V, and I which are corrected everywhere, the matrix E (or alternatively S) is corrected
   either only on a list of neighbors which are affected by printing decisions at (i,j) AND are close enough to (i,j) (i.e., N(i,j)∪M(i,j), or
   everywhere as needed for complete propagation of the corrections.

This limitation of which part of E (or alternatively S) is corrected is what allows our invention to run faster than with complete propagation, and the decision for this trade-off is made by knowing a good estimate of the implied error.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

We will only show the implementation where S is stored and E is calculated via E=S−V. The other implementation where E is stored is easily derived by anyone skilled in the art.

Figure 3:
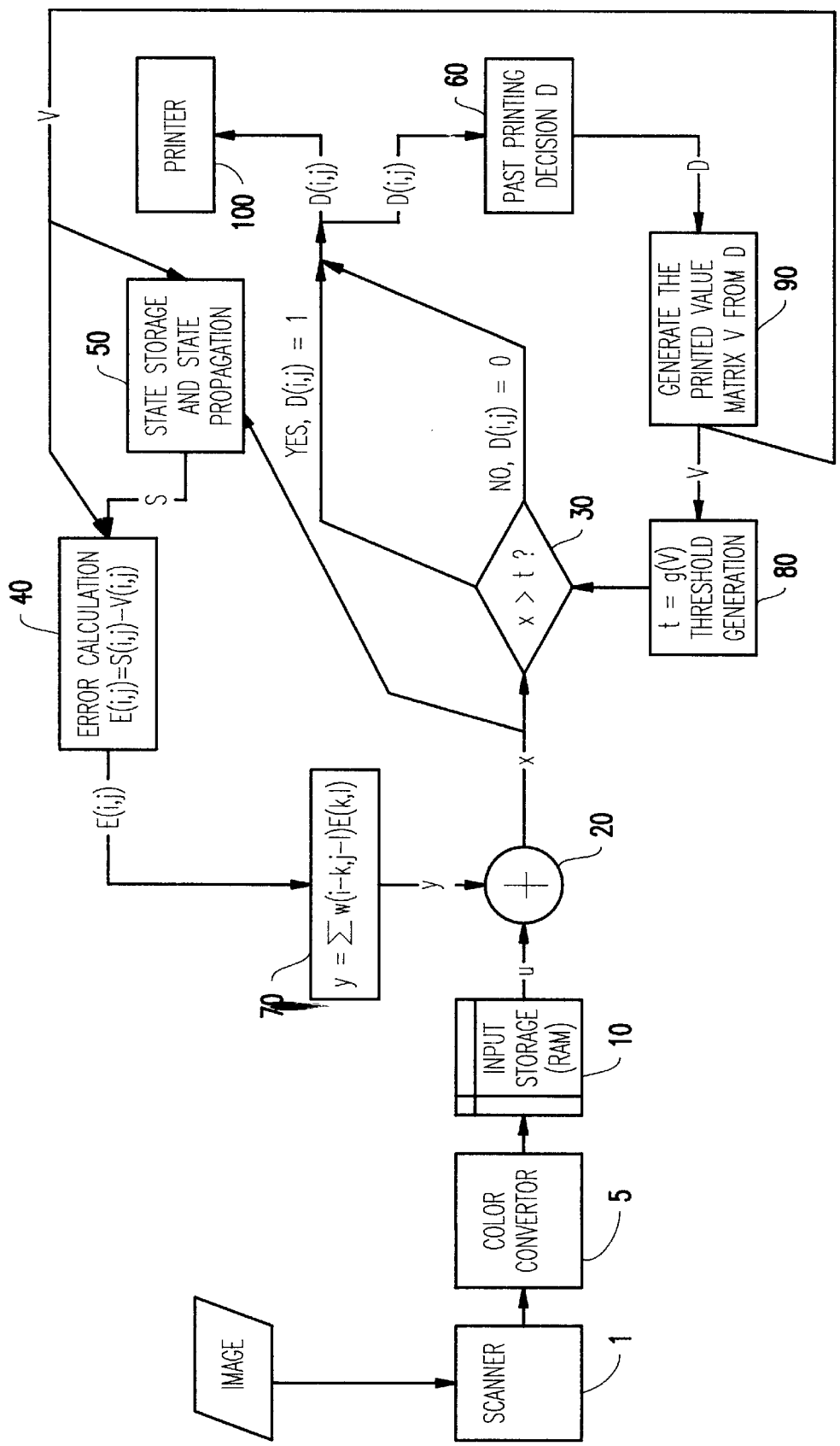
FIG. 3 is a block diagram of past printing decisions used to generate the printed value matrix in the practice of the invention.

Referring again to the drawings and, more particularly, to FIG. 3, all data about a Continuous Tone (CT) source image I is stored in the Image Random Access Memory (RAM) 10. In the preferred embodiment, the data is acquired using a scanner 1. In the case of a color image, the image is decomposed into three monochromatic components using a RGB splitter, followed usually by a RGB-YMCK (Red, Green, Blue to Yellow, Magenta, Cyan, Black) converter if the purpose of the invention is to print on paper. These tasks pertaining only to color image processing take place in the color convertor 5. However, the image might be acquired as a table of data, it might be in grey scale, and the output might be some form of screen rather than paper, in which cases part of the equipment in FIG. 3 is not needed in the implementation.

The output of the Image RAM 10 is an input signal u for each pixel (i,j) of image I, where i and j refer respectively to the horizontal and vertical coordinates of the pixel being treated. In the case of a color image, u also depends on the component, say YMCK, being treated, but in the sequel, we will suppose we are dealing with a greyscale image I since the modifications for color will be obvious to anyone skilled in the art. The invention makes decisions whether to print or not to print a black dot at the pixel (m,n) of the printed image I'. In the color image case, the decision is to print or not to print a dot in the limited set of colors (either RGB or YMCK). All printing decisions will be made to solve the problems previously mentioned as well as possible.

The pixel u of the image I at location (i,j) is added to the weighted errors y in summer 20 to obtain x=u+y. This value x is then compared with the threshold t in comparator 30 to decide whether to print (D(i,j)=1) or not to print (D(i,j)=0) a dot. The threshold t is obtained from the array 90 storing the matrix V via threshold generator 80 and is defined in the preferred embodiment as t=V(i,j). The decision to print D(i,j) is sent to the printer 100.

Figure 4:
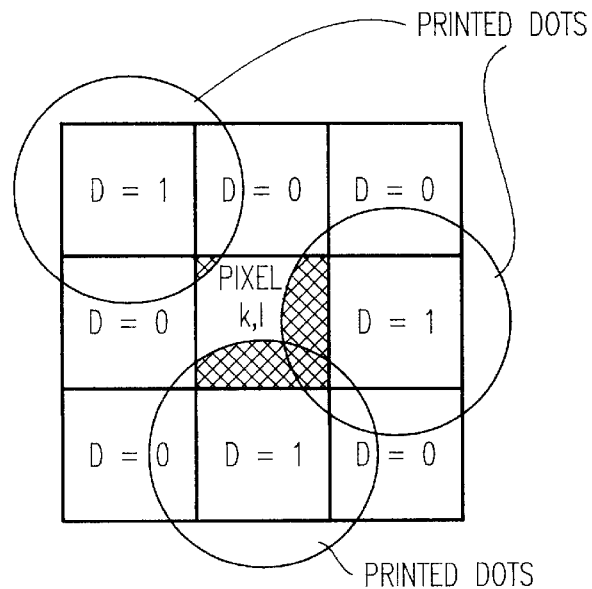
FIG. 4 is a block diagram illustrating the architecture of the system which implements the preferred embodiment of the invention.

The decision to print D(i,j) is stored in past printing decision storage 60, which forms the matrix D and is used to determine the matrix V in array 90 at the current pixel and past pixels as shown in FIG. 4.

Figure 1:
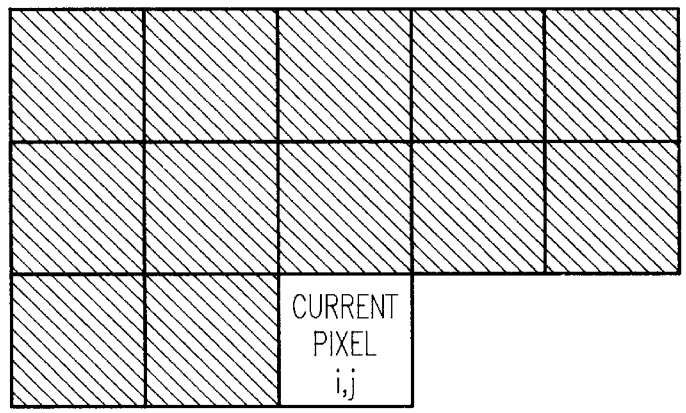
FIG. 1 is a block diagram representing a list L(i,j) of neighbors of a current pixel (i,j) taken into account in an error diffusion algorithm.
Figure 2:
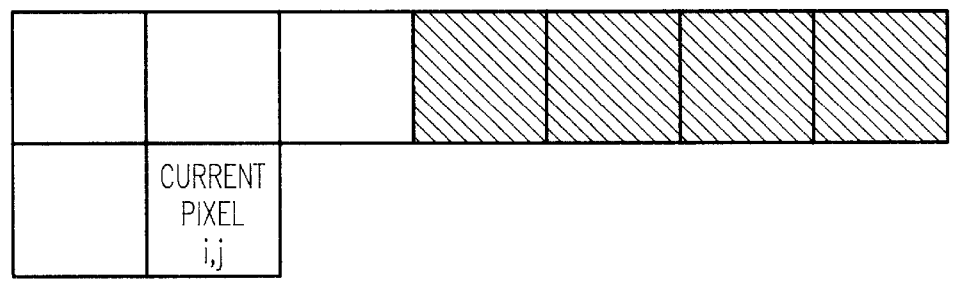
FIG. 2 is a block diagram representing the set M(i,j) (shaded squares) of pixels close to (i,j) but not in N(i,j) where corrections are propagated.

In the preferred embodiment, the value of V at each pixel (k,l) is determined by D at location (k,l) and at neighboring locations N(k,l). If a pixel in N(k,l) has not been processed before, it is assumed that D at that pixel is 0. In the preferred embodiment, if D(k,l)=1, then V(k,l)=1. If D(k,l)=0, then V(k,l) is determined by the overlap of the surrounding pixels. For example, in FIG. 4, let z be the area of the shaded region divided by the area of a square. Then V(k,l) is defined as 2z-1. I(k,l) will indicate which three of the neighbouring cells has D=1 and which five of the neighbouring cells has D=0 so that z can be calculated from I(k,l). V and x are used to calculate the current state, update the states in N(i,j) and propagate the states to pixels in M(i,j). This is done in state storage and state propagation device 50. An example of M(i,j) is shown shaded in FIG. 2.

The past error is updated using the information in the array 90. This can be done in two ways. In the first method, the printing decision D is used to change E directly by looking at how V in the neighbors of the current cell is changed. In the second method (which is described in detail here), E is changed by using the relation E=S-V. This is done in error calculator 40.

A change of error in past pixels causes it to be propagated in subsequent pixels up to the current pixel. This propagation can be truncated to only a few pixels in the neighbourhood of the current pixel. The pixels that need to be updated by this propagation is given by (N(i,j)∩P(i,j))∪M(i,j). Again, the propagation can be done in two ways. Either the state of future pixels are changed (as is done here in state storage and propagation device 50) or the error of future pixels are changed directly.

Figure 5:
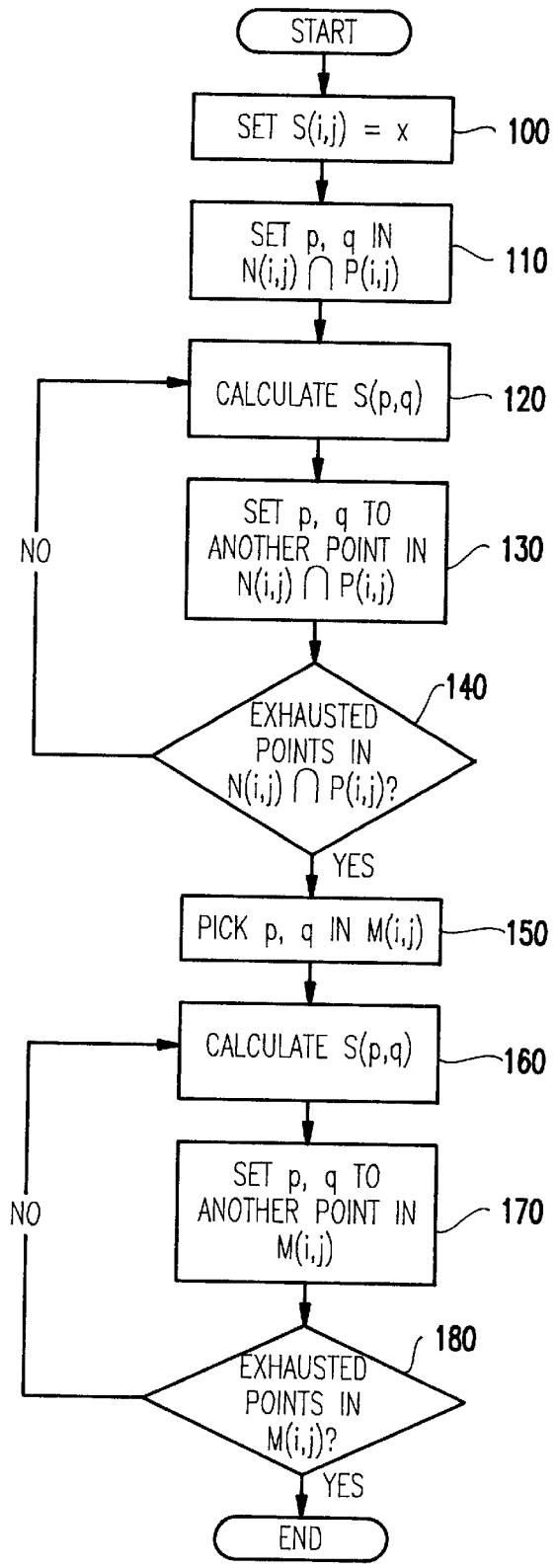
FIG. 5 is a flow diagram showing the logic of the propagation of the corrected error in the practice of the invention.

A flowchart of the algorithm for storing the current state and updating S and propagating the changes in S in function 50 is given in FIG. 5. The updated and propagated state is calculated according to the equation:

$$S(i,j) = G(i,j) + \sum_{(k,l) \in L(i,j)} w(i-k, j-l)(S(k,l) - V(k,l))$$

More particularly, the process begins by setting S(i,j) to x in block 100. Next, choose p,q from N(i,j)∩P(i,j) in block 110. The order in which p,q are chosen is consistent with the order in which pixels are processed in the error diffusion algorithm. S(p,q) is then calculated using the above equation in block 120. After this calculation, p,q is set to another point in N(i,j)∩P(i,j) in block 130. A test is made in decision block 140 to determine if all points in N(i,j)∩P(i,j) have been exhausted. If not, the process loops back to block 120 to make the next calculation. When all points have been exhausted, then p,q is picked in M(i,j) in block 150. The order in which p,q are chosen is consistent with the order in which pixels are processed in the error diffusion algorithm. S(p,q) is then calculated using the above equation in block 160. After this calculation, p,q is set to another point in M(i,j) in block 170. A test is made in decision block 180 to determine if all points in M(i,j) have been exhausted. If not, the process loops back to block 160 to make the next calculation. When all points have been exhausted, the process is complete.

The weighted error y to summer 20 is calculated in the preferred embodiment as a weighted sum of the errors $$E(i,j), \text{ i.e., } y = \sum_{(k,l) \in L(i,j)} w(i-k, j-l)E(k,l).$$

The weights could be taken from usual error diffusion algorithms such as Stucki (1981) or Jarvis (1976), but they can be taken from any set of weights corresponding to error diffusion algorithms.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An error diffusion with correction propagation method for printing grey scale or color images comprising the steps of:

defining a matrix D of printing decisions and a matrix V of actual areas in each pixel covered by a printing action;

storing data of a continuous tone source image I in an image Random Access Memory (RAM), an output from the image RAM being an input signal u for each pixel (i,j) of I, where i and j refer respectively to horizontal and vertical coordinates of the pixel being treated;

adding a weighted error signal y to the input signal u to generate an output signal x;

comparing the output signal x to a threshold t and generating a printer decision signal based on the threshold t;

storing a predetermined number of past printing decision signals in the matrix D;

generating printed values in the matrix V given by the stored past printing decision signals;

generating a threshold t from the matrix V as t=V(i,j);

calculating current states in a matrix S using the output signal x and the matrix V, updating states in pixels N(i,j) and propagating the states to pixels in M(i,j);

updating past errors in E(i,j) using the propagated states from the matrix S and the matrix V;

calculating the weighted error signal y as a weighted sum of the errors E(i,j); and outputting printer decision signals to a printer to print a grey scale or color image.

2. The error diffusion method for printing grey scale or color images recited in claim 1, wherein the step of calculating the weighted error signal y is performed by calculating $$y = \sum_{(k,l) \in L(i,j)} w(i-k, j-l)E(k, l).$$

3. The error diffusion method for printing grey scale or color images recited in claim 1, further comprising the step of scanning an image to generate a digitized version of the image for storing in the image RAM.

4. The error diffusion method for printing grey scale or color images recited in claim 3, further comprising the step of converting a scanned color image from red, green, blue to cyan, yellow, magenta, black (RGB-CYMK) for printing a color image.

5. A halftoning printer apparatus incorporating error diffusion with correction propagation for printing grey scale or color images comprising:

- an image Random Access Memory (RAM) for storing data of a continuous tone source image I, an output from the image RAM being an input signal u for each pixel (i,j) of I, where i and j refer respectively to horizontal and vertical coordinates of the pixel being treated;
- an adder for adding a weighted error signal y to the input signal u to generate an output signal x;
- a comparator connected to the adder for comparing the output signal x to a threshold t and generating a printer decision signal based on the threshold t, the comparator outputting printer decision signals to a printer to print a grey scale or color image;
- a matrix D of printing decisions and a matrix V of actual areas in each pixel covered by a printing action, a predetermined number of past printing decision signals being stored in the matrix D and printed values being generated and stored in the matrix V given by the stored past printing decision signals;
- a threshold generator connected to the matrix V for generating a threshold t from the matrix V as t=V(i,j);
- a calculator for calculating current states in a matrix S using the output signal x and the matrix V, updating states in pixels N(i,j) and propagating the states to pixels in M(i,j);
- an error calculator for updating past errors in E(i,j) using the propagated states from the matrix S and the matrix V; and
- a weighted error calculator for calculating the weighted error signal y as a weighted sum of the errors E(i,j).

6. The halftoning printer apparatus as recited in claim 5, wherein the weighted error calculator calculates the signal y as $$y = \sum_{(k,l) \in L(i,j)} w(i-k, j-l)E(k, l).$$

7. The halftoning printer apparatus as recited in claim 5, further comprising a scanner for scanning an image to generate a digitized version of the image for storing in the image RAM.

8. The halftoning printer apparatus as recited in claim 7, further comprising a color converter connected to the scanner for converting a scanned color image from red, green, blue to cyan, yellow, magenta, black (RGB-CYMK) for printing a color image.

* * * * *